United States Patent [19]

Peter

[11] 4,015,491
[45] Apr. 5, 1977

[54] TURRET LATHE

[75] Inventor: Fernand Peter, Mulhouse, France

[73] Assignee: Manurhin-Automatic, S.A., Mulhouse-Cedex, France

[22] Filed: Apr. 8, 1976

[21] Appl. No.: 675,182

[30] Foreign Application Priority Data

June 13, 1975 France .............................. 75.18552

[52] U.S. Cl. .................................... 82/2 R; 29/47; 74/813 L; 74/822; 82/21 R
[51] Int. Cl.² ........................................... B23B 3/18
[58] Field of Search ......... 29/47, 42; 82/2 R, 36 A, 82/21 R; 74/813 L, 822–825

[56] References Cited

UNITED STATES PATENTS

| 3,141,356 | 7/1964 | Herbkersman | 74/822 |
|---|---|---|---|
| 3,301,106 | 1/1967 | LeBrusque | 29/42 X |
| 3,798,722 | 3/1974 | Lutz | 74/813 L |
| 3,815,452 | 6/1974 | Wilhelmy | 82/2 R |
| 3,835,516 | 9/1974 | Fullerton | 29/47 |

*Primary Examiner*—Leonidas Vlachos

[57] ABSTRACT

A horizontal shaft, to one end of which there is affixed a tool-carrying turret, is rotatably mounted in a part of the frame of the lathe. The above shaft is parallel to the axis of the spindle of the lathe, such spindle being rotatably mounted in the head stock. The shaft and the turret are reciprocated longitudinally of the axis of the shaft by a longitudinal advancing mechanism, such shaft also being rotated in steps, that is, indexed around its axis by a transverse feeding mechanism. Such transverse feeding mechanism comprises an oscillating arm which is selectively rigidly connected to the shaft carrying the turret; the oscillatable arm is pivotally connected by an articulating means to a driving rod connected to a driving mechanism which is mounted for pivotal movement around a fixed axis which is parallel to the shaft carrying the turret and is spaced from the latter by distance R equal to that at which such axis lies from the axis of the articulating means connecting the outer free extremity of the oscillating arm to the driving rod.

10 Claims, 8 Drawing Figures

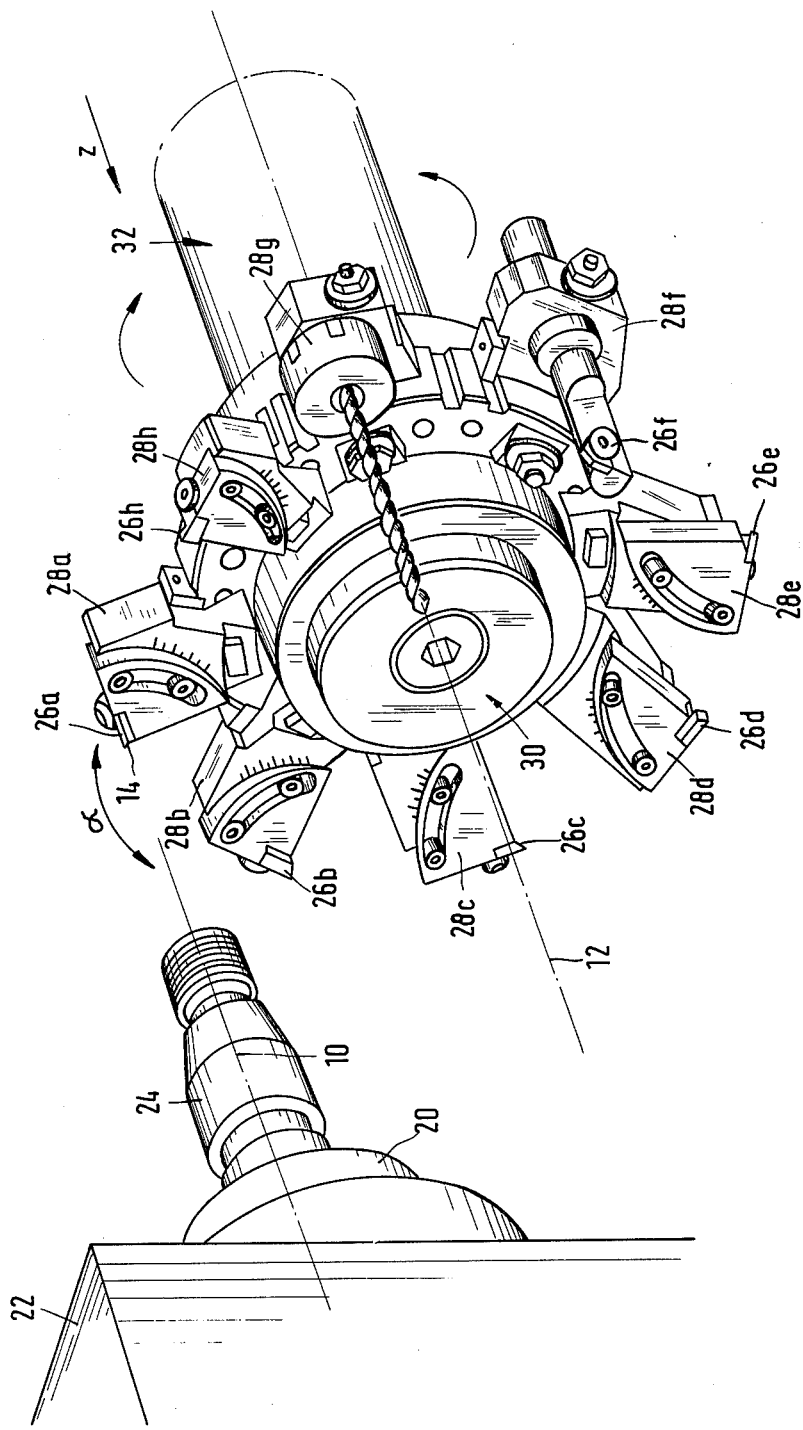

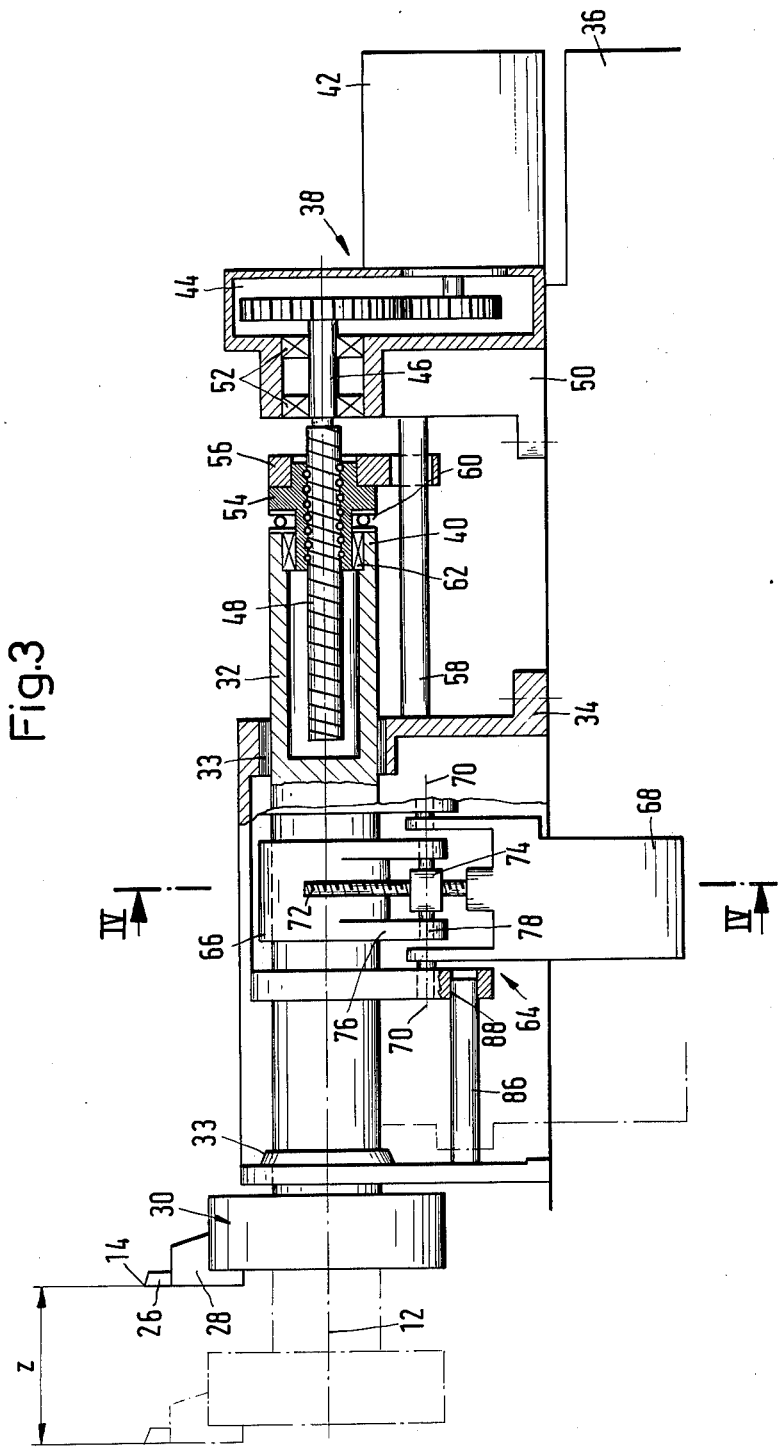

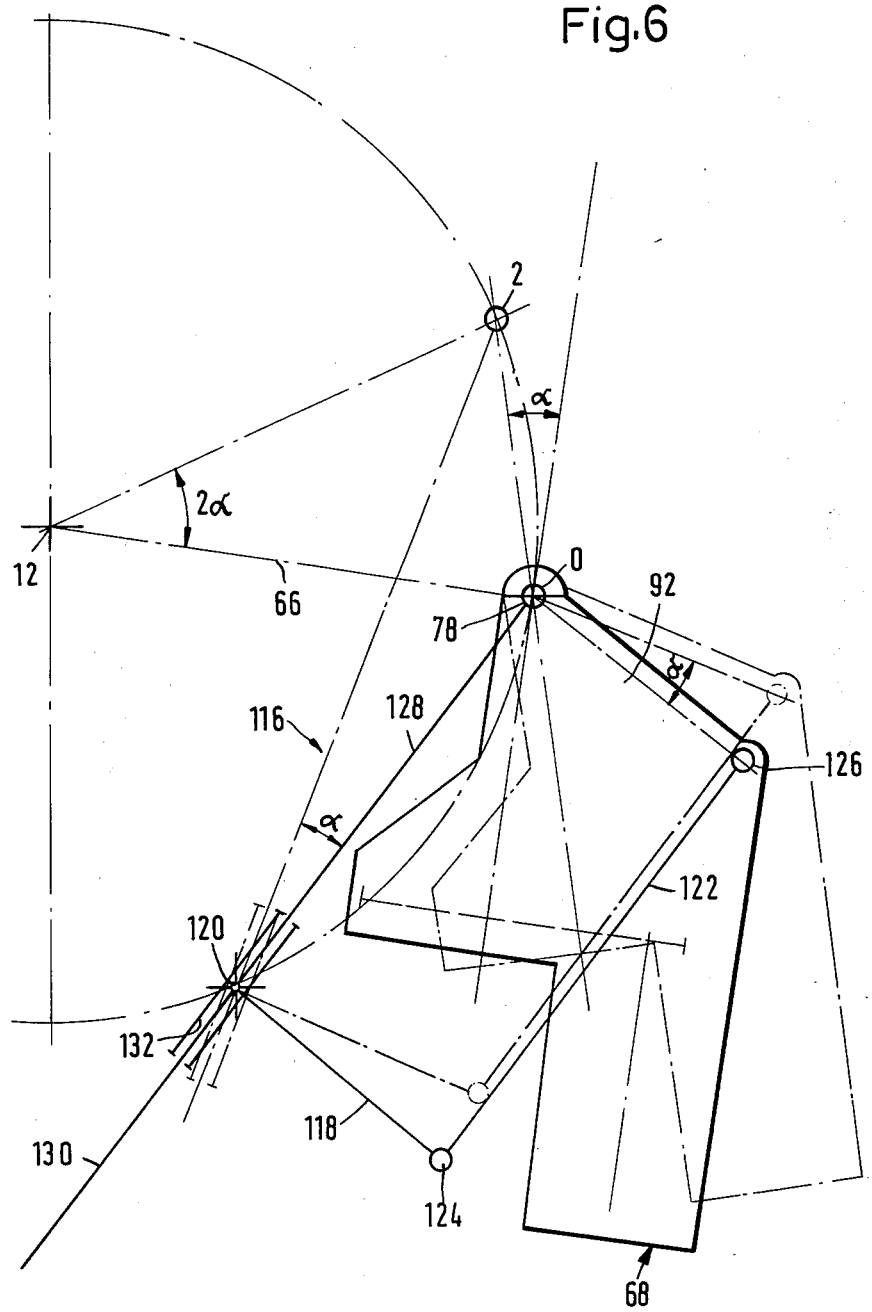

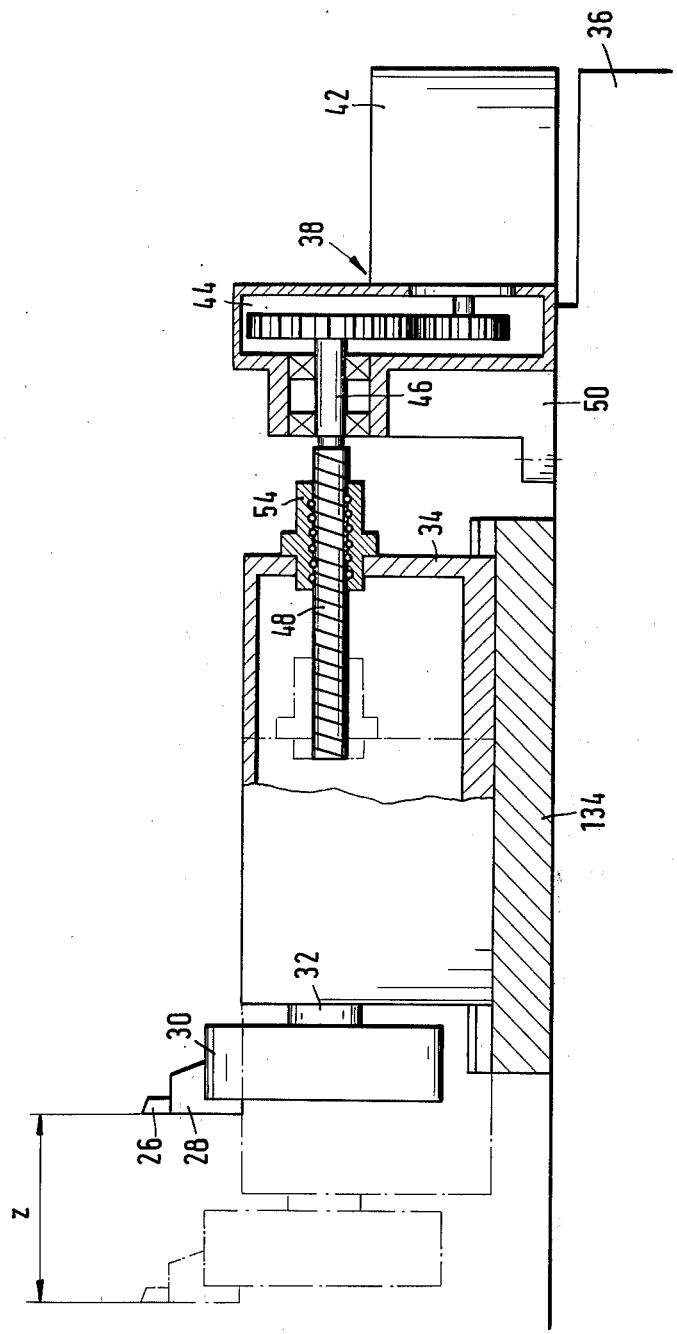

TURRET LATHE

The present invention relates to a turret lathe which is operated either automatically or semi-automatically.

There has previously been proposed a turret lathe of the type having a tool-carrying turret mounted upon a fixed part of the lathe frame and affixed to the end of a shaft carrying such turret, the shaft being parallel to the axis of the lathe spindle. In such prior lathe such shaft is capable, on the one hand, of displacement in translation along its axis under the action of a longitudinal advancing mechanism and, on the other hand, is displaced in rotation around its axis under the action of a transverse advancing or indexing mechanism.

Such transverse advance of the tool-carrying turret by indexing it about the axis of the turret-carrying shaft gives rise to an essential problem. Such problem is that the functional relationship between the angle $\alpha$ through which a turret is rotated in machining a workpiece having a radius $r$ is complex. If one considers FIG. 1 herein, in which the reference characters 10 and 12 designate, respectively, the axis of the spindle (not shown) of the lathe and that of the turret (not shown), it is clear in effect that the radius $r$ is related to the angle $\alpha$ as follows:

$$r = 2R \sin \alpha/2 \qquad (1)$$

In this relation R designates the radius of the circle through which the tool designated 14 is rotated, that is to say, the distance separating the axes 10 and 12 being given such that at the value 0 of the angle of displacement of the turret (angle $\alpha = 0$) the working point of the tool 14 will be located upon the axis 10.

To obtain a machining of the workpiece having the given radius $r$, the rotation of the turret from the 0 position of the angle $\alpha$ responds to the relation:

$$\cos \alpha = (2R^2 - r^2 12R^2) \qquad (2)$$

It should be remembered that the length $l$ of the arc subtended by the chord $r$ is given by the relation:

$$1 = \pi (R\alpha/180) \qquad (3)$$

No prior mechanical system for varying the angle $\alpha$ (or of the length $l$) takes into account relations 2 and 3 for obtaining the exactness of the radius $r$ desired. It is thus necessary to make use of an electronic system of correction at the level of the controller to introduce an arc-chord correction in the control of the indexing or transverse advancing rotation of the turret.

To avoid a too costly solution, it has been proposed to control the rotation of the turret by maintaining a gauge or a cam of appropriate form, usually movable, in abutment with the end of an ascillating arm which is fixedly connected to the shaft which caries the turret. No such a control considerably limits the possibilities of use of the lathe, which is thus not a simple machine to reproduce.

The present invention essentially comprises the controlling of the rotation of the turret by a mechanism which is designed to avoid the introduction of the arc-chord correction in the transmission of the movement which it defines in such manner as directly to control the displacement of the tool in question.

More precisely, the lathe according to the invention is characterized in that its transverse advancing mechanism comprises an oscillating arm which is susceptible of being selectively made fast to the shaft which carries the turret and which is connected at its extremity by an articulating means to the driving rod of a driving mechanism which is pivotally mounted around a fixed axis parallel to the axis of the shaft carrying the turret, and spaced therefrom by a distance equal to that which separates the axis of the shaft carrying the turret from the axis of the articulating means connecting the free end of the oscillating arm to the driving rod.

With such pivotal mounting of the driving means associated with the shaft carrying the turret, it can be seen that the displacement of the tool varies linearly as a function of the displacement of the driving rod. Since such displacement can be controlled with precision, with the aid of a stepping motor or of an accurate positioning means, it is clear that the displacement of the tool can be immediately simply and precisely controlled by the transverse advancing mechanism.

In order to avoid a mechanical instability at the passage of the zero or dead center point of the oscillating arm, a mechanical positioning system is provided between the driving mechanism and the oscillating arm in order to insure at each position of the latter a predetermined fixed position of the driving mechanism parallel to the resulting position of the articulating means which connects the driving rod to the oscillating arm. In a preferred embodiment, such positioning mechanism comprises a stabilizing lever pivotally mounted around a fixed axis parallel to the axis of the shaft carrying the turret and spaced therefrom by the distance R, a positioning rod slidably mounted in such lever and pivotally connected to the oscillating arm around the axis of the articulating means, and a rod connecting the driving mechanism to the end of the stabilizing lever.

The present invention will be better understood in the following description and upon reference to the annexed drawings which illustrate exemplary embodiments thereof.

In the drawings:

FIG. 1, previously briefly referred to, is a schematic view illustrating the geometry of the problem;

FIG. 2 is a fragmentary view in perspective of a first embodiment of turret lathe in acordance with the invention, such turret lathe having a turret with 8 tool positions;

FIG. 3 is a schematic view partially in elevation and partially in vertical section illustrating the longitudinal advancing mechanism and the transverse advancing or indexing mechanism for the turret in accordance with the invention;

Figure 8:
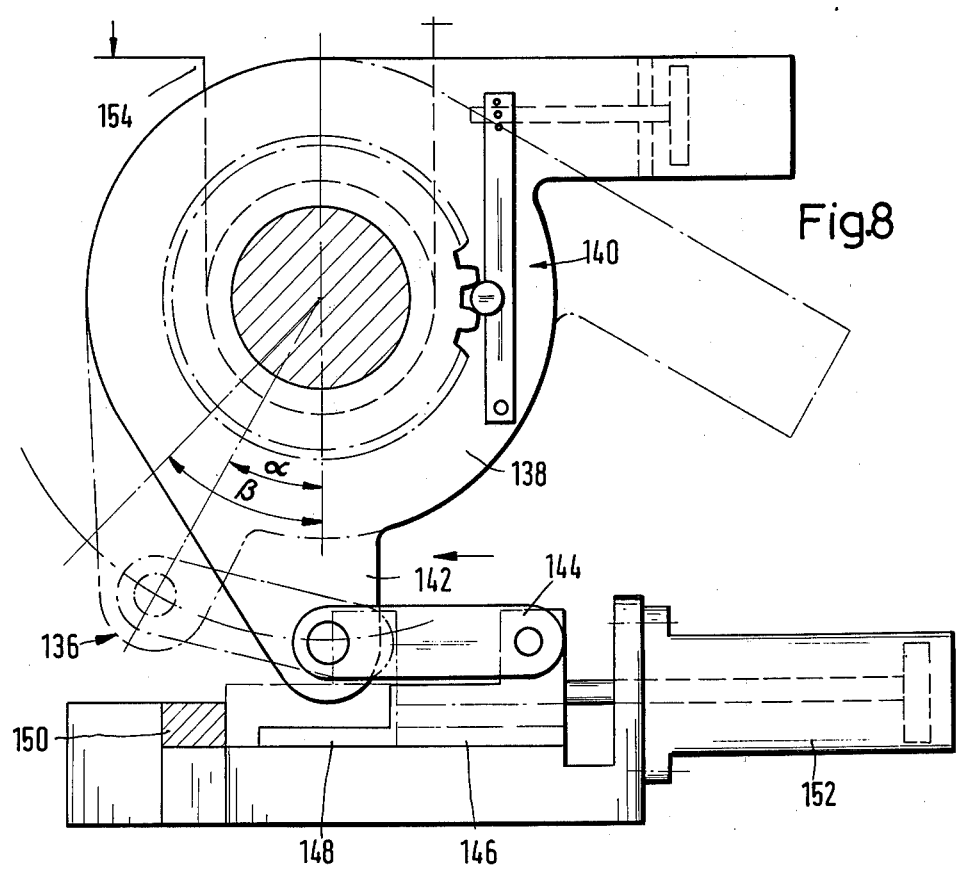
Figure 4:
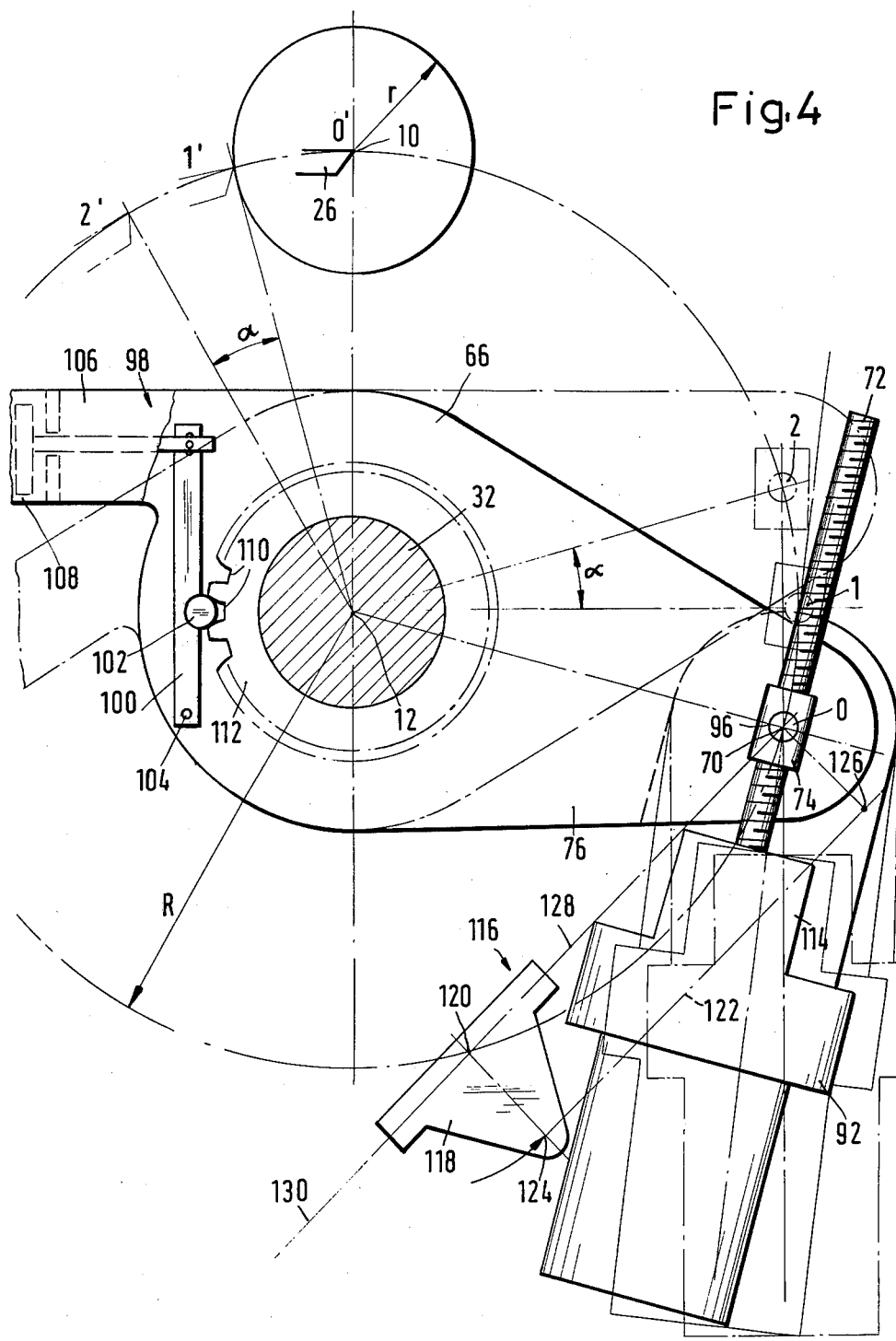
FIG. 4 is a schematic view in section taken along line IV—IV of FIG. 3.

FIG. 6 schematically illustrates the dynamics of the mechanism positioning system shown in FIG. 4 for associating the oscillating arm and the driving mechanism of the embodiment of FIG. 3;

FIG. 7 is a schematic view in section similar to FIG. 3 illustrating a second embodiment of the turret lathe of the invention, and FIG. 8 is a schematic view of a mechanism for adjusting the position of the tool adaptable for use in a lathe in accordance with the invention.

The turret lathes of the invention operate in accordance with a generally known principle. Such lathes essentially include a work-piece carrying plate or spindle 20 mounted for rotation in a fixed headstock 22 in such manner as drivingly to rotate a work-piece 24 such as a bar or a piece held in a mandrel, such work-piece being machined to a predetermined shape. The machining of the work-piece 24 is carried out with the aid of a plurality of tools of known form, such tools being designated 26a, 26b . . . 26h, in the example shown in FIG. 2 there being 8 tools, the tools being affixed with the aid of 8 corresponding tool carriers 28a, 28b . . . 28h upon a turret 30. The turret 30 is affixed by means 33 at the extremity of a turret mounting shaft 32, the axis 12 of which (see FIG. 1) is parallel to the axis 10 of the spindle 20. The turret 30 and the shaft 32 are shown as being mounted horizontal. It is to be observed that the tool carriers 28 are mounted and adjusted in such manner that the working points 14 of the tools are all located at the same distance R from the axis 12 of the turret 30. In the direction axial of the turret, the points 14 of the tools are all mounted in the same transverse plane. The determination of the number, the form, and the position of the tools 26 (as well as the construction of the corresponding tool carriers 28) will, of course, be adapted to be satisfactory for each series of machining steps to be carried out.

The shaft 32 is, as it will appear later on, mounted upon the fixed frame of a lathe (not shown in FIG. 2) in such manner as to enable the reciprocation of shaft 32 longitudinally of its axis 12, the displacement being related to the longitudinal advance of the particular tool being employed, such as the tool 26a in the case of FIG. 2, and also in rotation around its axis 12, such latter displacement controlling the transverse advance of the tool 26a being employed and also the changing of the tool after such tool has completed its machining operation.

As explained above, the problem which underlies the use of the turret 30 in controlling the transverse advance of each tool 28 consists in that the angle of rotation of the turret around such axis is not related in a simple manner to the distance separating the tool 26 being used from the axis 10, which is necessary to be controlled at each instant. In the absence of an appropriate turret driving means, which constitutes the object of the present invention, it has hitherto been necessary to introduce an arc-chord correction into the electronic control means if one desired to be able to work by means of a direct command, that is to say, by a simple means for compensating the difference between the peripheral displacement of the tool and the corresponding variation of the distance between such tool and the axis 10.

Figure 5:
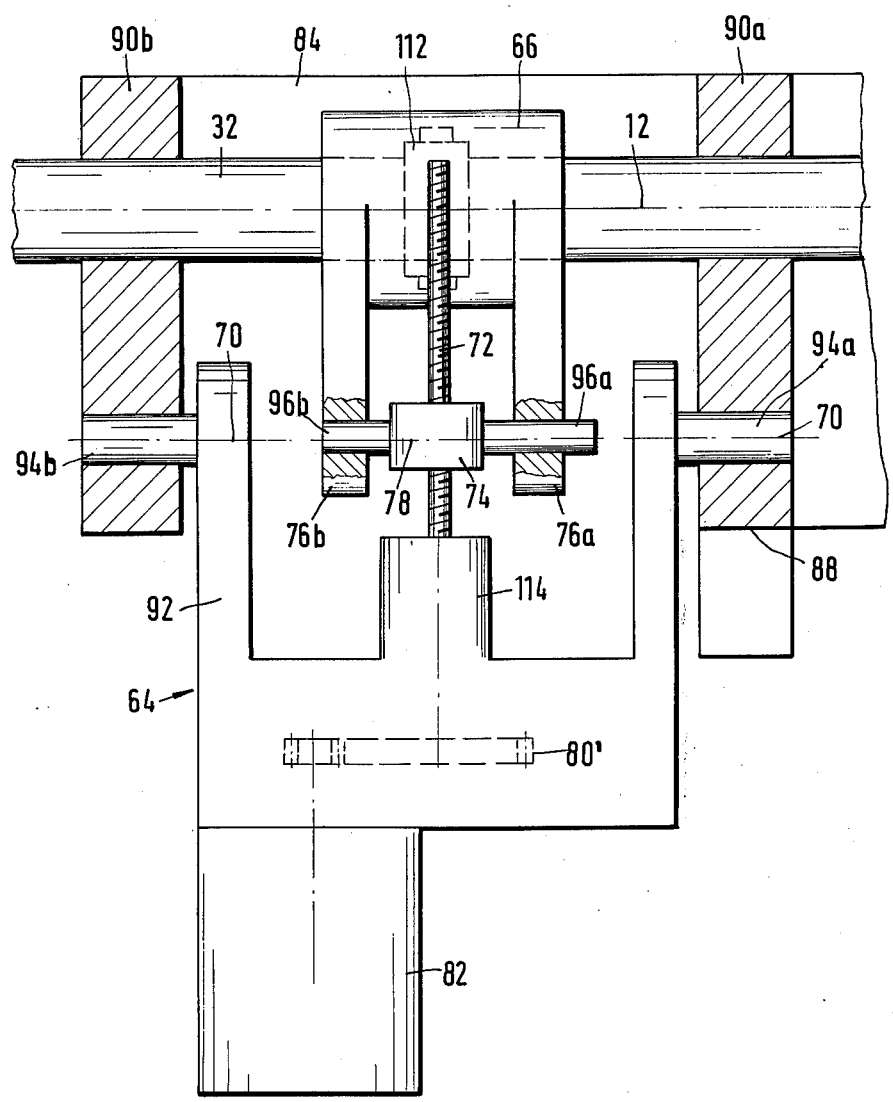
FIG. 5 illustrates the different articulations of the transverse advance mechanism shown in FIG. 3.

To avoid the necessity for the introduction of such correction, the present invention incorporates a mechanism, shown more fully in FIGS. 3, 4 and 5, for controlling the transverse advance or indexing of the turret.

FIG. 3 schematically illustrates the mounting of the shaft 32 carrying the turret and the frame of a large capacity lathe. In this type of machine the turret-carrying shaft is of great diameter in order to provide a large overhang or "swing". The shaft is mounted directly for reciprocation and rotation by the use of appropriate bearings 33 in a caisson or box 34 which is affixed by appropriate means to the frame 36 of the lathe.

The displacement and translation of the shaft 32 along its axis 12 with respect to the caisson 34 is controlled by a longitudinal advancing mechanism generally indicated by the reference character 38 which is disposed between the rear end 40 of the shaft 32 and the frame 36.

The mechanism 38 may be any one of a number of known types which are suitable to displace the shaft 32 through a predetermined distance at the direction of a highly accurate controlling means. In the embodiment shown in FIG. 3, the mechanism 38 includes a steping motor 42 which drives, through the intermediary of a speed-reducing gear train 44, the rear end 46 of a screw shaft 48 coaxial with the shaft 32. The screw shaft 48 is mounted for rotation about its axis, but is fixed against movement along its axis by the mounting of its end 46 in a conventional fixed bracket 40 mounted on the frame of the lathe, the screw shaft being mounted in an appropriate manner such as in a pair of ball bearings 52. A ball nut 54 cooperates with the screw shaft 48 and is maintained fixed from rotation about the axis of the shaft by a plate 56 which is fixed to the nut 54 and which is guided longitudinally by a fixed bar or rod 58 which is disposed horizontal and lies parallel to the screw shaft 48. A ball thrust bearing 60 is disposed between the nut 54 and the rear end 40 of the shaft 32. A needle bearing 52 is preferably provided between such extremity 40 and the nut 54 so as to maintain the coaxiality of the screw shaft 48 with respect to the shaft 42.

It is to be understood that with such embodiment the operation of the motor 42 produces longitudinal motion of the turret by reason of the interaction of the screw shaft 48 and the nut 54. The extent of such longitudinal travel of the turret is represented by the reference character z in FIG. 3. The rotational displacement of the shaft 32 carrying the turret 30 is controlled by a transverse advancing mechanism, indicated generally by the reference character 64, which is by preference disposed interiorly of the caisson 34. Such mechanism 64 is composed of two main parts as follows:

an oscillating arm 66 which can selectively be made fast to the turret-carrying shaft 32 so as to rotate such shaft about its axis 12, and a driving mechanism 68 pivotally mounted as a whole around a fixed axis 70. The driving rod 72 of the driving mechanism 68 is connected by a pivotal connecting or articulating means 74 to the radially outer end 76 of the oscillating arm 60, means 74 having its pivotal axis 78 parallel to the axis 12 of the shaft 32.

It is essential to observe that the distance separating the axes 12 and 78 must be accurately equal to that which separates the axes 12 and 70. If one supposes incidentally (without its being an absolute necessity) that such distance is equal to the distance R separating the point 14 of the tool 26 from the axis 12, it is clear, as shown in FIG. 4, that the displacement under the action of the driving means 68 of the axis 78 of the articulating means 74 is strictly equal to the transverse advance of the point 14 of the tool 26.

In FIGS. 4 and 5, the different elements are represented in heavy full lines in the zero position ($\alpha = 0$) wherein the axes 70 and 72 are coincident; the articulating means 74 occupies the zero position in which the point of the tool 26 is disposed at 0' on the axis 10 of the spindle 20. When the driving means 68 is energized, the articulating means 74 is displaced along a circle having the radius R in order successively to occupy positions 1 and 2 (see FIG. 4), the point 14 of the tool then occupying, respectively, the positions 1' and 2'. The displacement of the point 14 with respect to the axis 10 is thus equal at each instant to the displacement of the axis 78 of the articulating means 74 which has been produced by the energization of the driving means 68.

Figure 1:
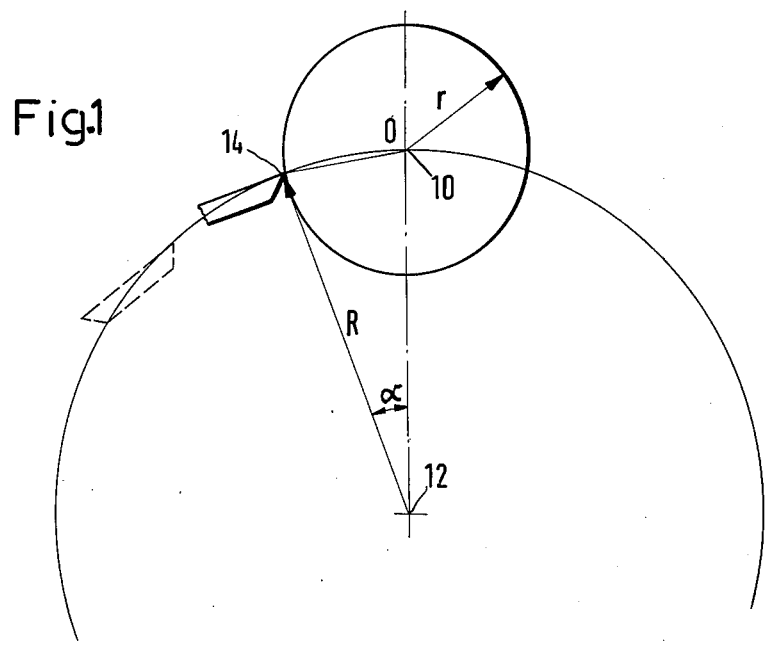

It will be observed that the relationship of the displacements described above may possibly be different from that shown at FIG. 1, or that the distances separating the axes 70 and 78 from the axis 12 may be different from the distance R separating such axis 12 and the axis 10.

In the particular preferred embodiment in which the driving rod 78 is constituted by a screw shaft which is mounted for rotation by a speed-reducing mechanism 80 by an electric motor 82 of a known type such as a step-by-step motor, the articulating means 74 is connected by a ball nut which cooperates with the screw shaft 72 and which is mounted for pivoting around the axis 78 on the extremity 76 of the oscillating arm 66.

A practical embodiment of the transverse advancing mechanism 64 is shown schematically in FIG. 5. In such figure, reference character 84 designates a cradle which is movable longitudinally with the shaft 32 in the caisson 34. The cradle 84 is mounted for rotation upon the shaft 32 and is immobilized from rotation by means of a horizontally disposed fixed bar 86 which extends parallel to the axis 12 and which slidingly cooperates with a corresponding opening 88 provided in one of the walls 90a or 90b of the cradle 84. The motor reducer 80-82 is fixed to a gear case 92 which is pivotally mounted by the intermediary of two aligned opposed shafts 94a and 94b in the two walls 90a and 90b of the cradle 84. The immobilization from rotation of the cradle 84 assures the fixity of the axis 70 of the shafts 94a and 94b around which the gear case 92 and the motor reducer 80-82 pivot.

The gear case 92 is preferably made with a form such that the screw shaft 72 may be mounted for rotation at its free extremity in such manner as not to require too great an overhang.

The arm 66 is made in the form of a fork, the nut 74 being mounted pivotally by the intermediary of two aligned opposed arms 96a and 96b between the forked ends 76a and 76b of the oscillating arm 66. The different pivoting devices are so constructed by the means of ball bearings (not shown) to assure the transmission of motion without play and with a minimum of friction.

It is particularly to be noted that the driving means constituted by the screw shaft 72, the motor reducer 80-82, and the ball nut 74 may be replaced by any other appropriate known means, which may be electric, pneumatic, hydraulic, etc. It is necessary only that the driving means be adapted, upon the receipt of a given command, to displace the axis 78 of the articulating means 74 through a corresponding distance. For example, such means may be made in the form of a servo-command in which the position of the driving shaft 72 is compared at each instant to the value of the entered command.

In order to permit a changing of the tool by an appropriate rotation of the turret (a rotation of ⅛ of 360° of the turret in the case of the turret, shown in FIG. 2), the oscillating arm 66 is selectively affixed to the shaft 32 by the intermediary of a locking indexing mechanism. One such construction is shown at 98 in FIG. 4.

In this construction, a lever 100 equipped in its median part with a tooth or similar abutment 102, is pivotally mounted at 104 on the oscillating arm 66. On a radial prolongation 106 of such arm there is fixed a control driving means, which may be hydraulic, mechanical or pneumatic, the particular means shown being a hydraulic means 108, for example, which is adapted to command the pivoting of the lever 100 between a locking position, in which it is shown, in which the tooth 102 cooperates with a notch 110 of a toothed ring 112 which is affixed to the shaft 32, and an unlocked position (not shown) in which the tooth 102 is withdrawn radially from the teeth on the tooth ring 112. The cooperation between the tooth 102 connected with the arm 66 and the toothed ring 112 solidly affixed to the shaft 32 assures on the one hand a locking in the rotational direction of the arm 66 upon the shaft 32 and on the other hand an indexing in such manner that the arm 66 can be locked upon the shaft 32 in only a finite number of predetermined fixed angular positions $n$ (equal in number to the notches 110 of the notched wing 112). It is well-known that the number $n$ must be chosen in such manner that, upon the changing of the tool caused by a given rotation (⅛ of 360°) of the turret, the point of the new tool will occupy exactly the place which was vacated by the point of to tool previously employed; it is to be understood that the arm 66 is maintained fixed during the changing of the tool.

It is also to be understood that the locking and indexing mechanisms 98 described above is only one of a number of possible such mechanisms adapted to maintain the arm 66 solidly connected to the shaft 32 in a given number $n$ of relative angular positions, preferably uniformly spaced.

It is to be observed that the locking of the arm 66 upon the shaft 32 is carried out in such manner that the thrust imposed by the working tool upon the workpiece being machined are transmitted to the screw shaft 72 by simple forces of traction and that at the output 114 (see FIG. 5) of the reducer 80 roller bearings are provided to oppose all actual displacement of the screw shaft 72 with respect to the gear case 92.

In the zero position of the arm 66 shown in FIG. 4, the axes 70 of the driving mechanism 68 and 78 of the articulating means 74 are coincident at O. It thus results that the angular position of the driving mechanism 68 is not determined at such position of the arm 66.

Since nothing is proposed other than the gear case to attain the ideal position represented in full lines in FIG. 4, the driving rod 72 and the articulating means 74 may be found in the neighborhood of position O to be subjected to very considerable forces which risk the damaging of the driving means.

To avoid such risk, the invention provides for the doubling of the connection constituted by the driving rod 72 and the articulating means 74 between the driving means 68 and the arm 66 by providing a mechanical positioning system adapted to assure at each position of the arm 66 a determined position of the driving means 68 particularly in the neighborhood of point zero. It is to be understood that the new connection is compatible at all points with the articulating connection 72—72.

One advantageous embodiment of such system of positioning is schematically shown at 116 in FIGS. 4 and 6. Such positioning system 116 includes:

a stabilizing lever 118 which is mounted for pivoting around a fixed axis 120. The lever 118 may be provided at such end with a shaft (not shown) which is mounted for pivoting in one of the walls, 90a for example, of the cradle 84 which is connected to the shaft 32 to travel longitudinally therewith (see FIG. 5). The axis 120 is separated from the axis 12 of the shaft 32 through the same distance as that which separates such axis 12 from the axes 70 and 78.

a rod 132 which is articulated upon the extremity 124 of the lever 118 and upon the gear case 92 of the driving means 68 around an axis 126. The axis 126 is chosen in such manner that the segment joining the axes 70 and 126 is equal and parallel to that which joins the axis 120 in the axis of articulation of the rod 122 upon the lever 118, in order thus to form a deformable parallelogram, and a positioning rod 128 which is articulated around the axis 78 upon the oscillating arm 66 and which is mounted for sliding at its free extremity 130 in a guide 132 disposed in the stabilization lever 118, the axis of the guiding means 132 intersecting the axis 120.

With the described construction, it will be understood that the angular displacement around the axis 12 of the arm 66 and, by that, the axis 78, through the intermediary of the positioning rod 128 produces the pivoting of the stabilization lever 118 around the fixed axis 120 and thus of the driving mediums 92 around the fixed axis 70. In FIG. 4 there is shown in dot-and-dash lines the relative positions of the elements of the system 116 when the arm 66 occupies its upper position 2 (see FIG. 4).

The positioning system 116 thus doubles the pivotal connection 94 provided between the driving rod 72 and the arm 66. Moreover, it presents, contrary to the first-described connection, the advantage of a double transmission in the neighborhood of the zero position; in other words, it fixes in a precise manner the angular position of the driving means 68 around the axis 70 when the arm 66 is found in the zero position.

The lathe described above functions as follows:

For a predetermined tool, the mechanisms 38 and 64 permit their respective controls to advance the tool longitudinally and angularly or transversely in response to directions issued by the controller. Such a command is simple, assuming that the two advances vary linearly as a function of the displacement of the motors 48 and 72, respectively. By way of example, the utilization of a stepping motor for the driving means 68 permits, with a suitable speed reduction in the driving train, the control the transverse advance with a precision of 5 (the value of a step).

When it is necessary to change a tool, that is, to effect a predetermined change of angular position of the turret 30 (⅛ of 360° in the disclosed lathe), the driving mechanism 68 is controlled in such manner as to displace the shaft 32 through a corresponding angle (from the position zero). Then, one proceeds to unlock the means 98 by feeding fluid to the hydraulic cylinder 108 in a known manner and by commanding the driving means 68 in such manner as to return the arm 66 to its zero position. One then locks the arm 166 to the shaft 32 in its new position by the means of the mechanism 98, the cooperation of the tooth 102 with respect to the particular groove 110 in the toothed ring 112 assuring the desired indexing of the arm 166 upon the shaft 32. The point 14 of the new tool is thus positioned on the axis of the spindle 20.

In the description set forth above it has been assumed that the lathe is of great capacity in which the turret and turret-supporting shaft will provide for a large swing or overhang. It is to be understood nevertheless that the advancing mechanisms 38 and 64 described above find an immediate application in the control of all turret lathes. It is important only that the mounting of the turret mounting shaft 32 on the frame of the lathe provides both for the movement in translation of such shaft along its axis and an angular displacement of the shaft around its axis.

In FIG. 7 there is shown a turret lathe with a capacity much smaller than that of the lathe shown in FIG. 3. In the lathe of FIG. 7 the shaft 32 which has a relatively small diameter, is connected for translation with the caisson 34, the latter being mounted for sliding in guideways 134 provided on the frame of the lathe. The shaft 32 is simply mounted for rotation about its axis upon the caisson 34. The mechanism 38 for longitudinal advance is, as above, disposed between the bracket 50 and the shaft 32, the nut 54 being simply affixed to the caisson 34. The mechanism for transverse advance (not shown in FIG. 7) is disposed within the interior of the caisson 34 in order to provide for the rotation of the shaft 34 with respect to the latter, as described above.

Although the pure and simple application of mechanisms 38 and 64 for the control of the shaft 32 for its transverse and longitudinal advance in turret lathe does not pose any particular problem, it is possible that the utilization of mechanism 64 is not always suitable for accomplishing the changing of the tools, primarily because of the question of lost time. It is certain in effect that the displacement of the articulating means 74 remains relatively slow, taking into account the precision demanded by such displacement and, because of that, the great reduction in speed which it is necessary to provide.

If the slowness of the operation of changing of the tool does not present a major inconvenience in the case of a machine of great capacity, it constitutes a handicap on the other hand in those machines with small capacity of the type represented for example in FIG. 7.

It is thus advantageous to provide an added mechanism for changing tools adapted to provide the desired rotation of the turret-carrying shaft 32 while unlocking the connection (100-102-110-112) between such shaft and the arm 66 subjected to the articulating means 74 of the driving means 68.

FIG. 8 illustrates at 136 an advantageous embodiment of such mechanism for changing the tool. Such means 136 incorporates a pivotal arm 138, arm 138 being disposed upon the shaft 132 and adapted selectively to be solidly connected to the latter by a locking and indexing system designated 140 similar to that described above at 98 in FIG. 4. The radial extremity 142 of the arm 128 is connected by the intermediary of a linkage 144 to a slide 146 running upon a guide 148 and subjected to the translation of the shaft 132. In the case of a lathe similar to that shown in FIG. 7, the guideway 148 may be fixed to the caisson 34. The displacement of the slide 146 upon the guideway is produced by means of a rapid action motor between a starting position which is that represented in full lines in FIG. 8 and a final position represented in dot-and-dash lines in such figure. The distance separating the two positions may be adjusted by means of an adjustable abutment in order to assure the desired rotation (angle α or β) of the shaft 32. The motor means contemplated may be constituted by a pneumatic cylinder or a hydraulic cylinder 152. A braking mechanism having a brake band such as that indicated schematically as shown at 154 is advantageously provided in order to assure the positioning of the shaft 32 during the adjusting of such shaft.

The tool-changing mechanism 136 operates as follows:

The system 98 is unlocked, whereupon one operates the locking system 140 to connect the arm 138 solidly to the shaft 32. With the aid of motor 152 the slide 146 is displaced upon the guideway 148 until it engages the abutment 150 at the end of its travel. The shaft 32 is then placed in rotation and rotated through the desired angle (⅛ of 360°). The system 140 is then unlocked and the arm 66 is again locked upon the shaft 32 by means of the system 98, the indexing into the new required position thus having been carried out automatically.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a turret lathe having a fixed frame, a lathe spindle mounted for rotation on the frame, a tool-carrying turret mounted on a turret-carrying shaft which is parallel to the spindle of the lathe, such shaft being adapted for translational movement along its axis under the action of a longitudinal advancing mechanism and angular displacement around its axis under the action of a transverse advancing mechanism, the improvement wherein the transverse advancing mechanism comprises an oscillating arm which is adapted to be fixedly connected to the turret-carrying shaft, a driving means having a driving rod, the arm being connected at its extremity by an articulating means to the driving rod of the driving means, the driving means being pivotally mounted around a second axis fixed parallel to the axis of the turret-carrying shaft, the second axis being separated from the axis of such shaft by a distance R equal to that which separates it from the axis of the articulating means connecting the free extremity of the oscillating arm to the driving rod.

2. A turret lathe according to claim 1, comprising a mechanical positioning system provided between the driving means and the oscillating arm so as to associate at each position of the latter a determined position of the driving mechanism parallel to the action of the positioning resulting from the articulation of the driving rod upon the oscillating arm.

3. A turret lathe according to claim 2, wherein the positioning system comprises a stabilizing lever mounted to pivot around a fixed axis parallel to the axis of the shaft which carries the turret and separated from the axis of the latter by the distance R, a positioning rod slidably mounted in such lever and articulated to the oscillating arm for pivoting around the axis of the recited articulation, and a link connecting the driving mechanism and the extremity of the stabilization lever.

4. A turret lathe according to claim 1 comprising a locking and indexing device provided between the oscillating arm and the shaft carrying the turret so as selectively immovably to lock the two elements together in a finite number of precisely determined angular positions which are uniformly spaced with respect to each other.

5. A turret lathe in accordance with claim 4, comprising means for changing tools adapted to unlock the indexing lock and rapidly to displace the turret around its axis through an angle equal to that which separates successive tools upon the turret.

6. A turret lathe according to claim 5, wherein the means for changing tools comprises a pivotal arm adapted to be connected by a second locking and indexing mechanism to the shaft which carries the turret in a number of finite exactly determined angular positions, and a rapidly acting motor means for deplacing the lever through a predetermined angle.

7. A turret lathe according to claim 1, wherein the driving rod is constituted by a screw shaft which is rotated around its axis by the driving mechanism, and the oscillating arm is connected to the driving rod by the intermediary of a nut which cooperates with the screw shaft.

8. A turret lathe according to claim 7, wherein the motor means comprises a stepping motor operating through an associated speed-reducing drive train.

9. A turret lathe according to claim 1, wherein the longitudinal advancing mechanism comprises a screw nut connecting means disposed between the turret-carrying shaft and the frame, and a motor means for longitudinally advancing and retracting such connecting means.

10. A turret lathe according to claim 1, wherein the shaft which carries the turret is slidingly mounted in a caisson fixed upon the frame, said caisson enclosing the transverse driving mechanism associated with the shaft which carries the turret.

* * * * *